United States Patent [19]
DeMoura

[11] Patent Number: 6,012,215
[45] Date of Patent: Jan. 11, 2000

[54] APPARATUS AND METHOD FOR INSERTING MULTIPLE SELF CLINCHING FASTENERS

[75] Inventor: Rene Henrique DeMoura, Carencro, La.

[73] Assignee: Begneaud Manufacturing, Inc., Lafayette, La.

[21] Appl. No.: 09/170,021

[22] Filed: Oct. 13, 1998

[51] Int. Cl.[7] .................................................. B21D 39/00
[52] U.S. Cl. ........................ 29/505; 29/243.5; 29/283.5
[58] Field of Search .................................. 29/283.5, 798, 29/505, 509, 432, 432.2, 243.5, 818; 227/149; 72/396, 466.8, 466.9, 470

[56] References Cited

U.S. PATENT DOCUMENTS

| | | |
|---|---|---|
| 2,186,892 | 1/1940 | Zenner . |
| 2,438,837 | 3/1948 | Archer et al. . |
| 3,699,626 | 10/1972 | Roth ...................................... 29/243.58 |
| 4,306,511 | 12/1981 | Ashby et al. ............................. 29/521 |
| 4,596,349 | 6/1986 | Herten . |
| 5,237,733 | 8/1993 | Ladouceur et al. ..................... 29/432.2 |
| 5,560,099 | 10/1996 | Leistner et al. ............................ 29/798 |

*Primary Examiner*—David P. Bryant

[57] ABSTRACT

A device for inserting multiple self clenching fasteners into a sheet of material with a press machine is disclosed. The press machine includes a ram and an anvil. In one embodiment, the device comprises a cylindrical member having a first end and a second end, and wherein the first end contains a bore and the second end is mounted to the anvil. The first end of the cylindrical member has formed thereon a shoulder. The device further includes a sleeve disposed about the shoulder and a spring for biasing the sleeve upward in the first position. In one embodiment, the sleeve is biased by the spring at a height above one end of the cylindrical member. The spring may be a urethane band or mechanical spring placed about the cylindrical member. The device further comprises a cylindrical cover attached to the sleeve, with the cylindrical cover being disposed over the compression spring. Also disclosed herein is a method for inserting self clinching fasteners into a sheet of material with a press.

18 Claims, 8 Drawing Sheets

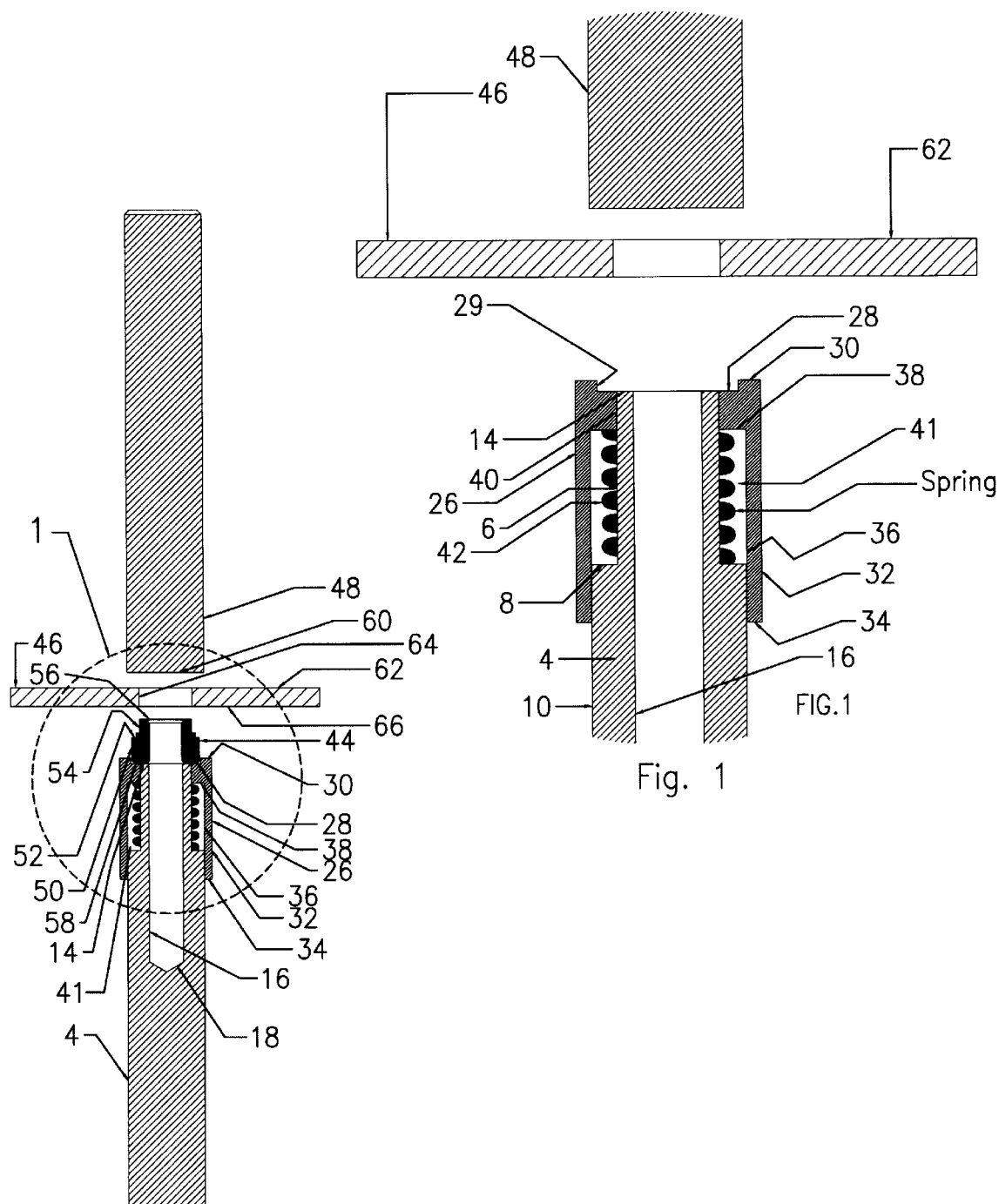

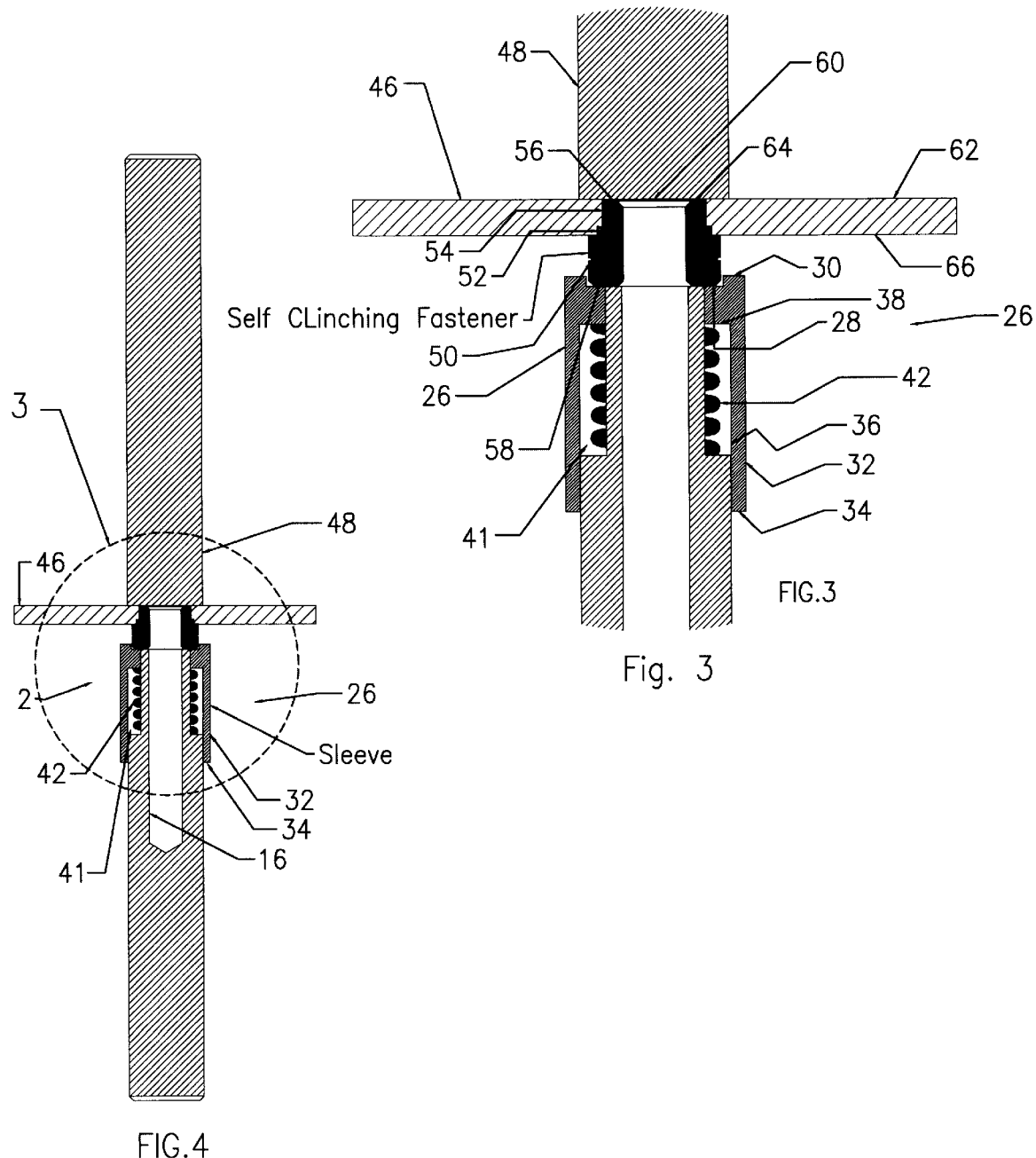

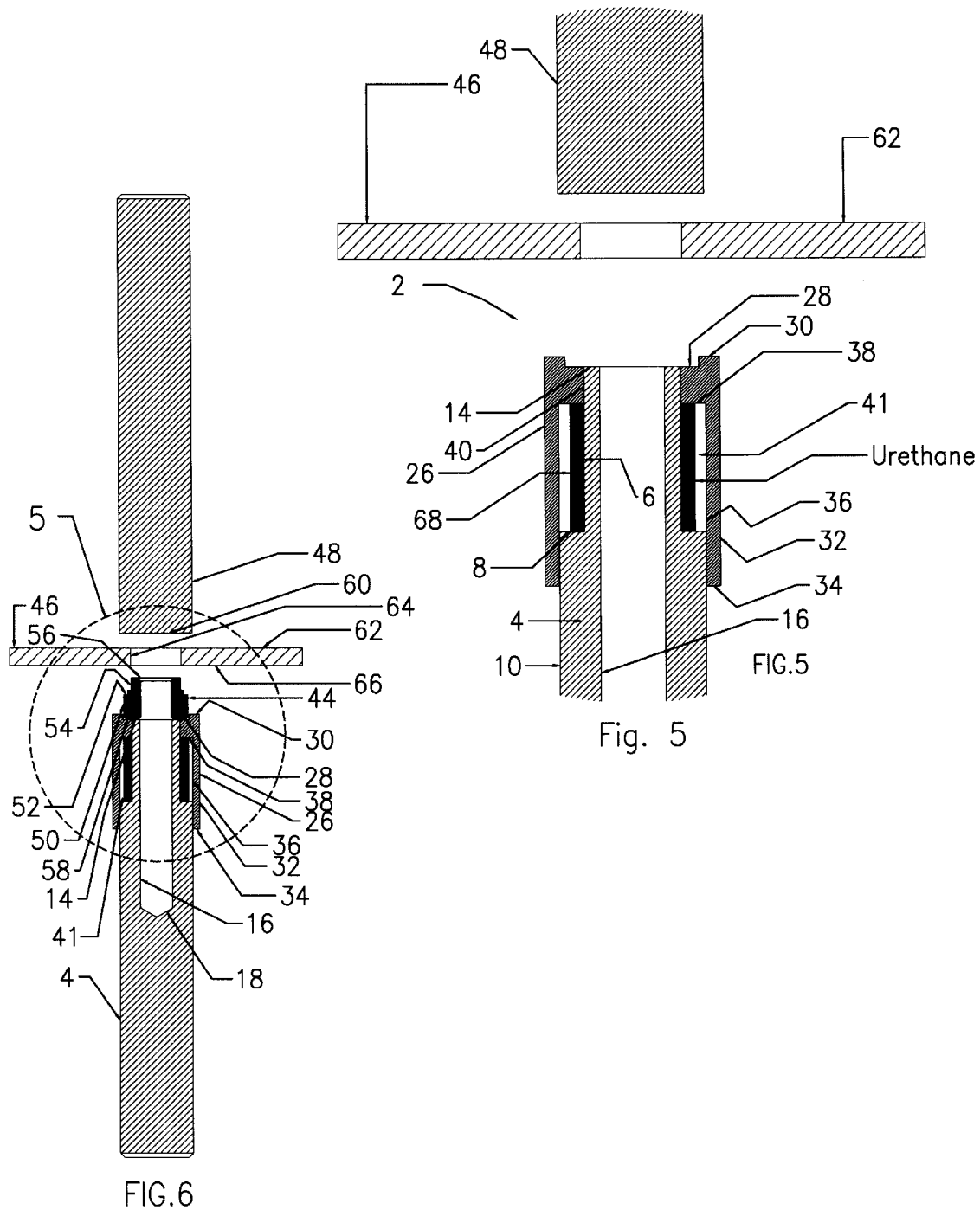

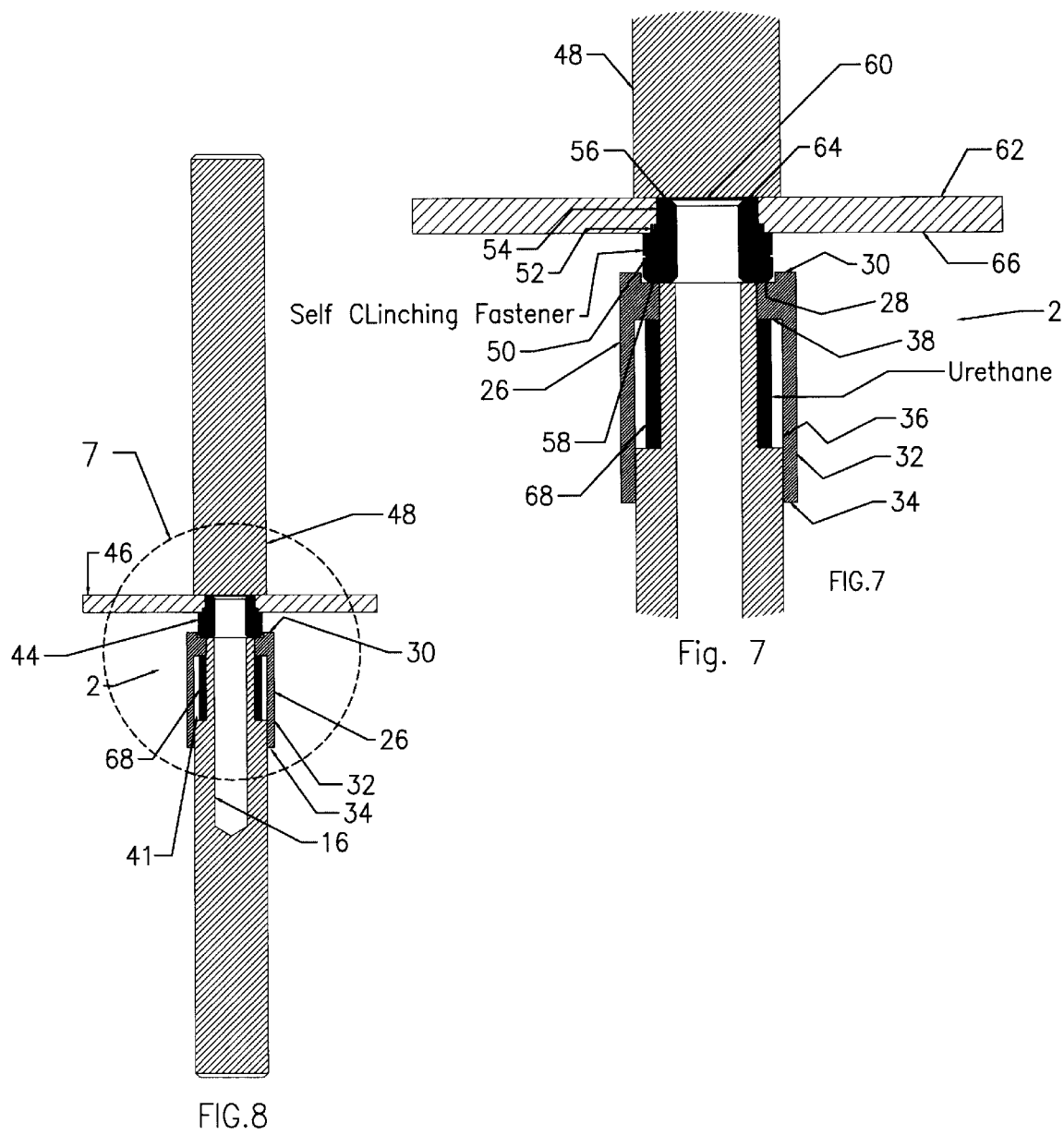

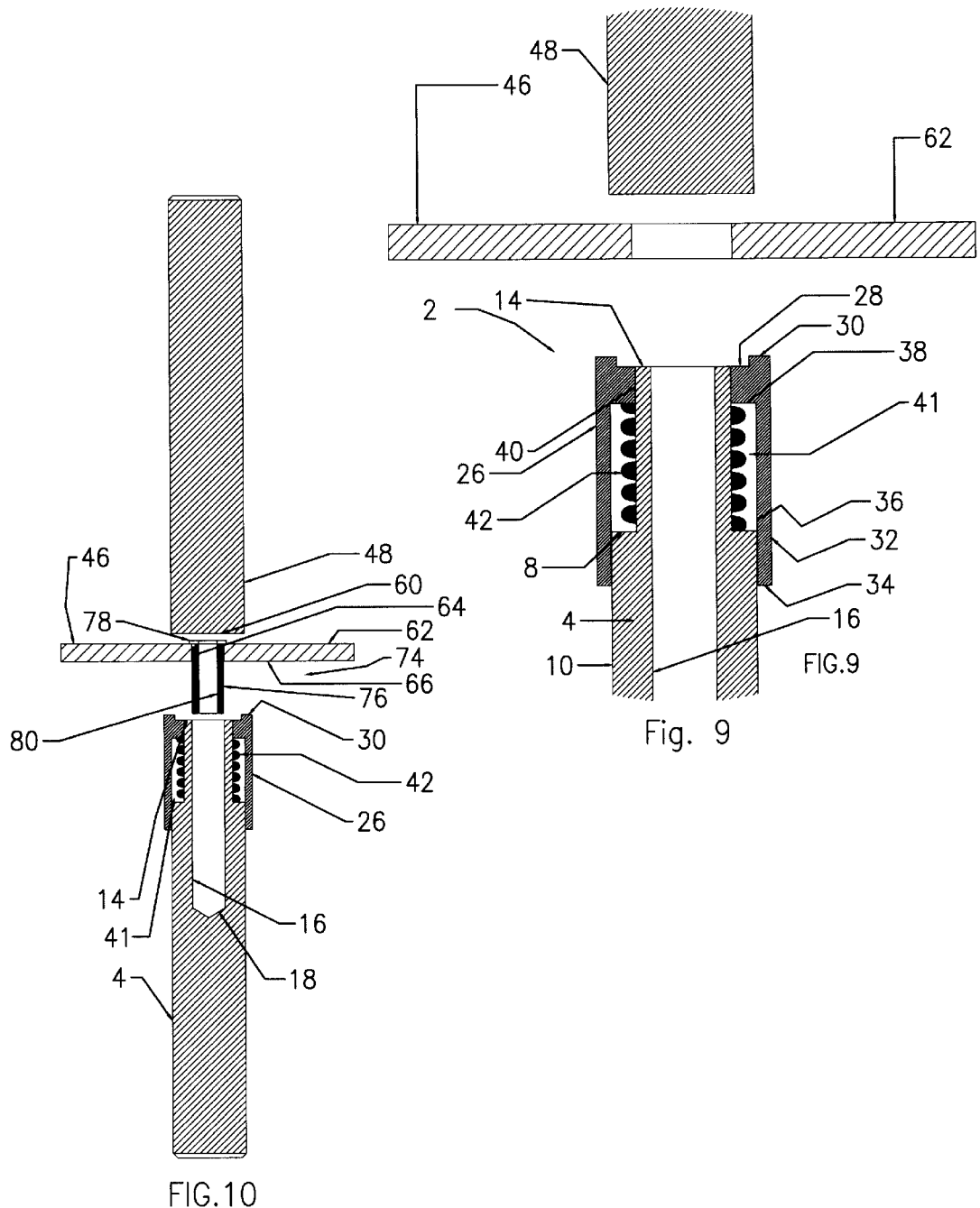

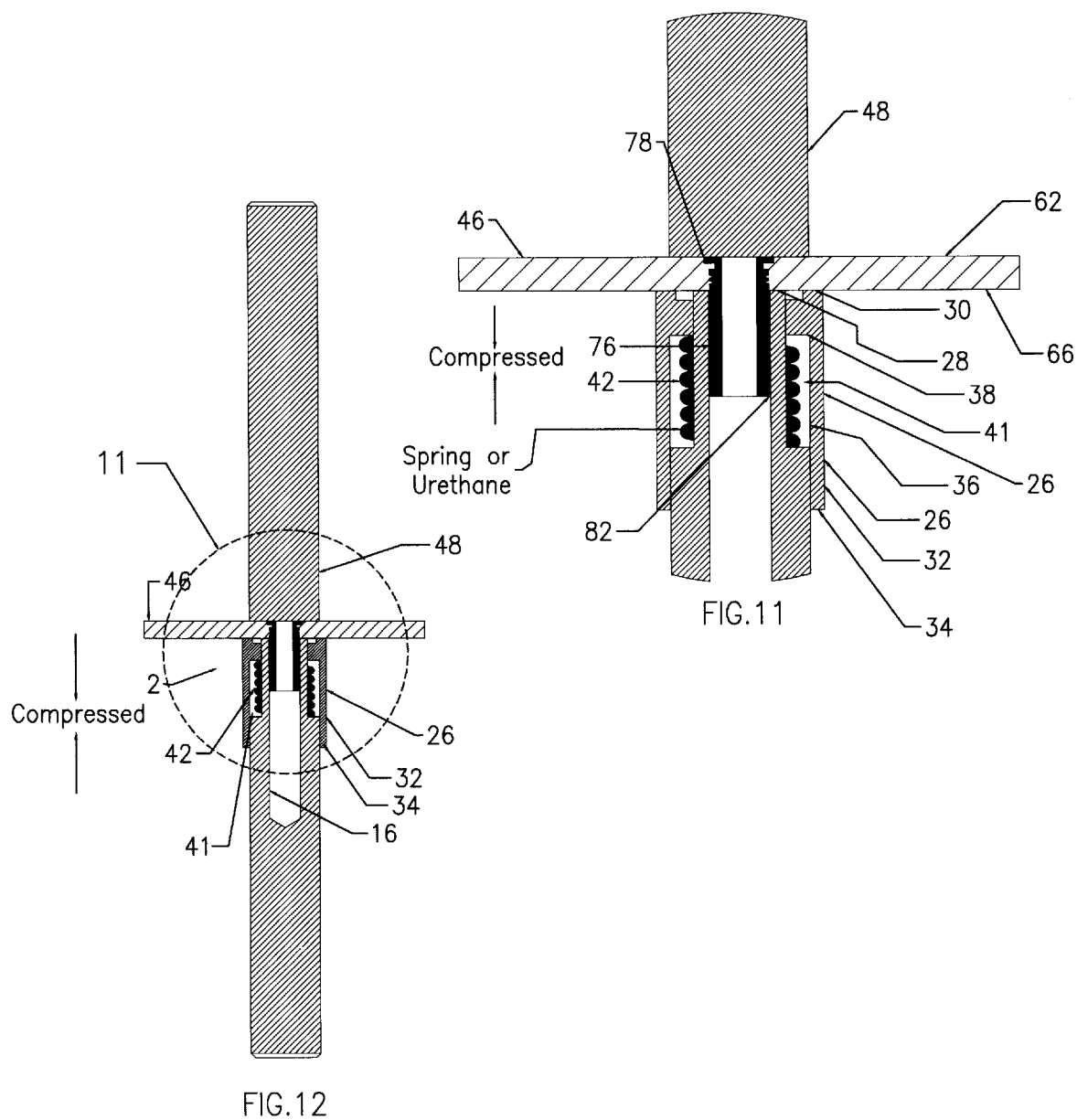

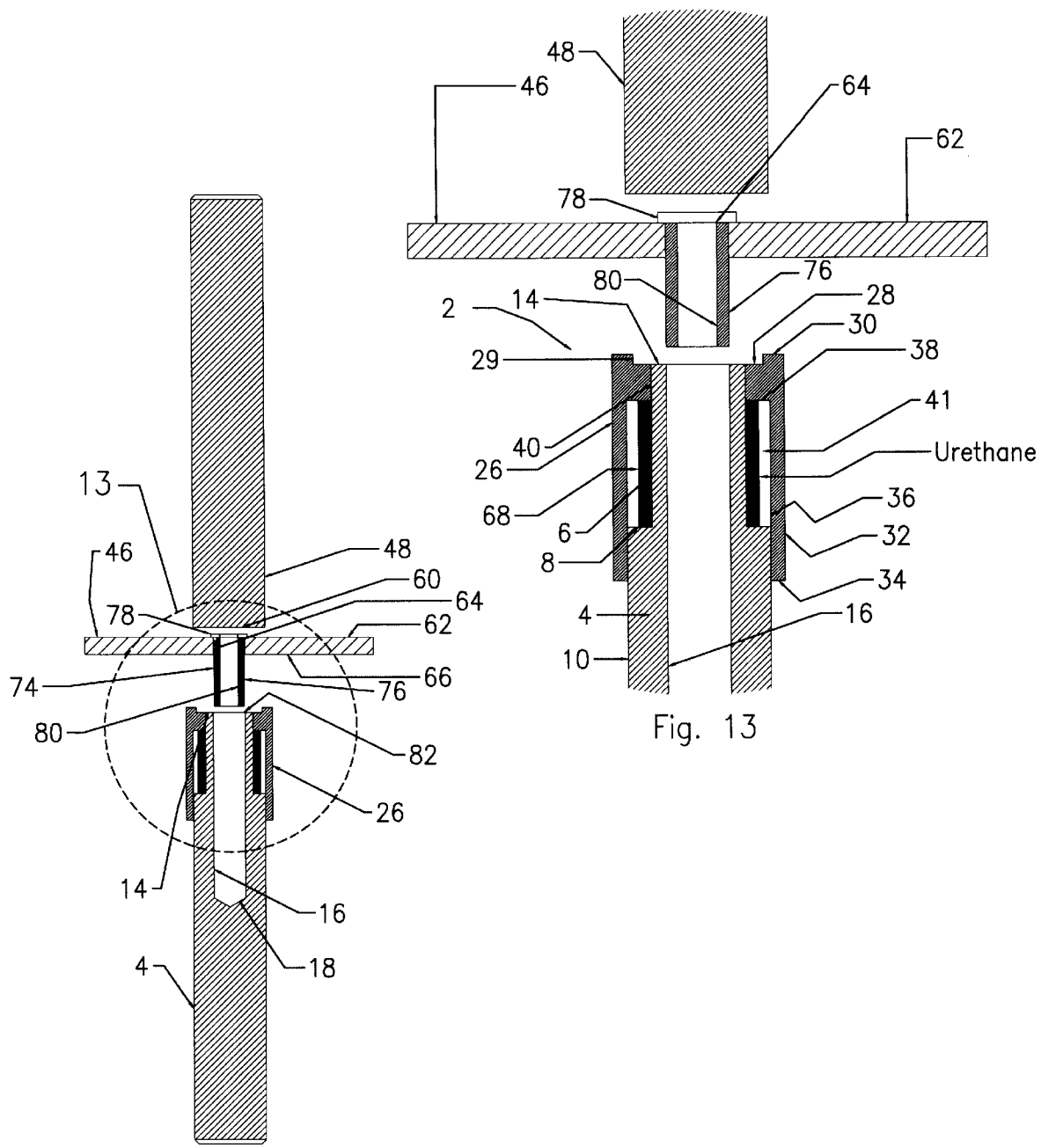

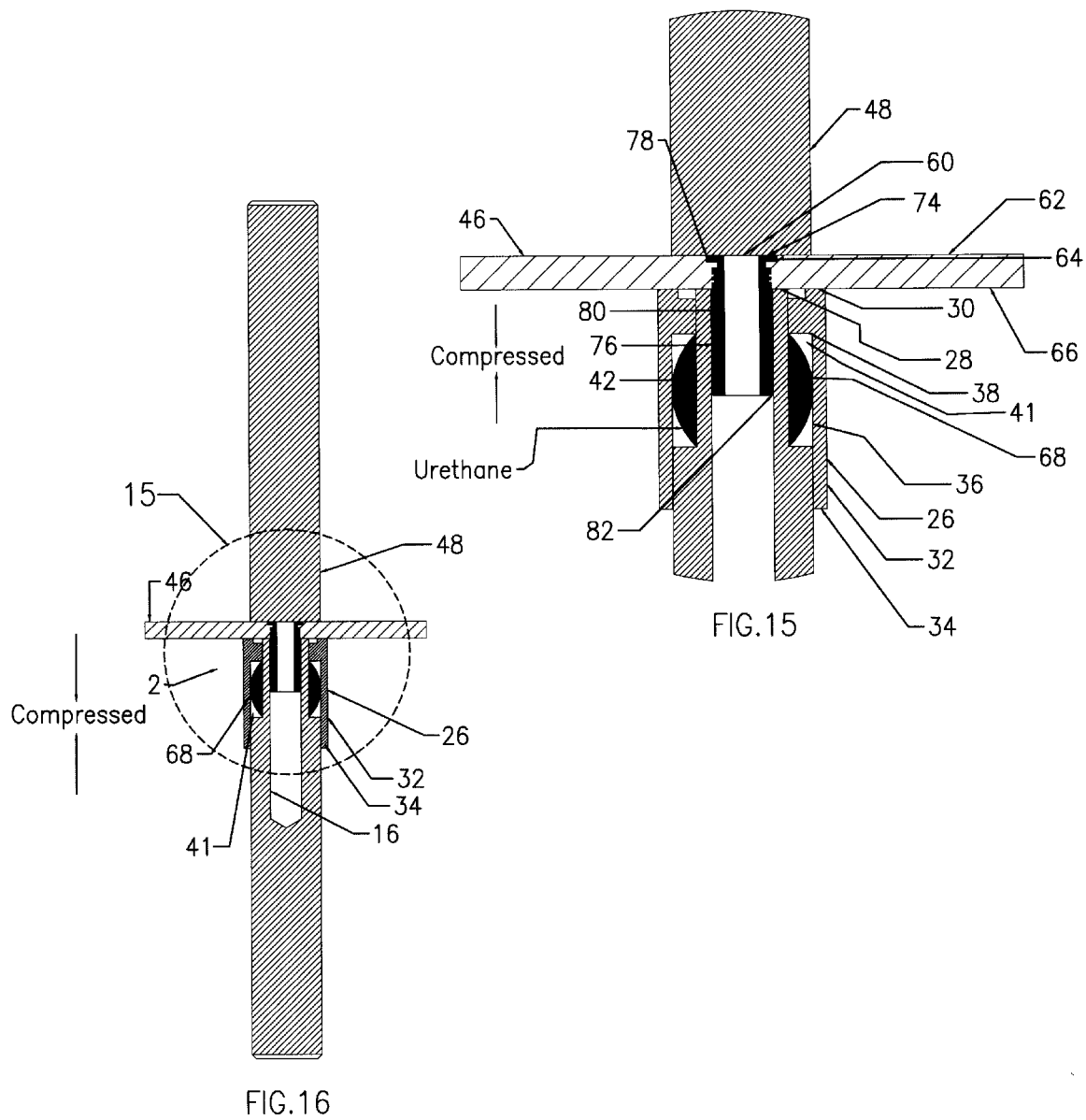

APPARATUS AND METHOD FOR INSERTING MULTIPLE SELF CLINCHING FASTENERS

BACKGROUND OF THE INVENTION

This invention relates to an apparatus and method for inserting multiple self clenching fasteners. More particularly, but not by way of limitation, this invention relates to an apparatus and method for inserting a self clenching fastener, stud, standoff, etc. into a sheet of material.

In modern day manufacturing, it becomes necessary to insert a fastener, stud, standoff, or other object into a sheet of material with the aid of a press. The sheet of material may be metal, plastic, etc. The typical installation requires a combination of fasteners, studs, standoffs be impressed into a sheet of material for varying purposes. Regardless of the specific purpose or structure, a single sheet of material will contain a combination of these fasteners, studs, standoffs, etc. The press is commercially available from Penn Engineering & Manufacturing Corp. under the mark PEMSERTER, and is also available, for example, from Haeger Company and Auto-Sert. Also, the fasteners, studs, standoffs, etc. are available from Penn Engineering & Manufacturing Corp. and Captive Fasteners Company under the names self clinching fasteners, studs, standoffs, etc.

Currently, a manufacturer sets up the press in order to install one specific type of fastener and proceed to install the fastener. As those of ordinary skill in the art will appreciate, a first type of tool in combination with a punch and an anvil will be required. After completion of this specific series of fasteners, the manufacturer would then retool and set up the press for a different object i.e. a stud. Generally, the setting-up of the press would include providing a different tool which is used in conjunction with the press, as those of ordinary skill in the art would readily understand. Thus, this second tool would be used to install a series of studs.

After completion of this specific series of studs, the manufacturer would then set up the press for a different object i.e. standoffs. Again, the same type of sequence would be utilized. The tool would be changed so that the standoffs can be properly inserted into the sheet of material. The teachings of the prior art require multiple tools in order to insert each object. The time required for switching from one tool to the next and multiple handling of the part is notable and represents a significant cost.

Therefore, there is a need for an apparatus and method that can expedite the insertion of objects (such as fasteners, studs, nuts, standoffs, etc.) into a sheet of material. There is also a need for a single tool that can be used for the pressing of studs, fasteners, standoffs etc into a sheet of material. Further, there is a need for a tool that will reduce that the amount to time a needed to install a series of fasteners, studs, standoffs, etc. onto a sheet of material.

SUMMARY OF THE INVENTION

A device for inserting a self clenching fastener into a sheet of material with a press machine is disclosed. The press machine includes a ram and an anvil. The sheet of material in the most preferred embodiment is a sheet of metal. The term self clenching fastener, as used herein, includes fasteners, studs, standoffs, nuts, etc. The ram is movable from a first position to a second position and the anvil is stationary. In one embodiment, the device comprises a cylindrical member having a first end and a second end, and wherein the first end contains a bore and the second end is mounted to the anvil. The first end of the cylindrical member has formed thereon a shoulder.

The device further includes a sleeve disposed about the shoulder and means, disposed about the cylindrical member, for biasing the sleeve upward in the first position. The sleeve contains on one end a raised shoulder and a depressed shoulder. In one embodiment, the raised shoulder of the sleeve is biased by the biasing means at a height above one end of the cylindrical member while the depressed shoulder is proximate the cylindrical member end. The biasing means may be a urethane band placed about the cylindrical member. The shoulder of the cylindrical member may contain thereon a urethane band. In this embodiment, the sleeve contains an outer diameter as least as large as the cylindrical member's outer diameter.

In another embodiment, the spring member is a compression spring placed about the cylindrical member. The compression spring abuts the shoulder. The device further comprises a cylindrical cover attached to the sleeve, with the cylindrical cover being disposed over the compression spring.

Also disclosed herein is a method for inserting a multiple self clinching fastener into a sheet of material with one set of tools, such as metal, with a press. The press contains an anvil and a movable punch, with the anvil having an apparatus mounted thereon. The method comprises mounting the sheet of metal and placing the fastener on the first side of the apparatus. The punch is lowered so that the punch is contacted with the metal sheet and in turn the apparatus. The apparatus comprises: a cylindrical member having a first end and a second end, and wherein the first end contains a bore and the second end is mounted to the anvil; a sleeve disposed about the cylindrical member; a spring member disposed about the cylindrical member, and adapted for biasing the sleeve upward in the first position.

The method further includes lowering a shaft that extends from the stud through an inner bore of the apparatus. The spring member is biased downward, with the spring member being shouldered against a ledge that is formed on the cylindrical member. Thereafter, the stud is pressed into the sheet of metal. In one of the embodiments, the spring member is a urethane band disposed about the cylindrical member and the step of biasing the spring member includes compressing the urethane. Alternatively, the spring member is a compression spring that includes a series of coils and the step of biasing the spring member includes compressing the coils.

An advantage of the present apparatus is that one tool performs the job of two. Another advantage is that with the novel tool, jobs can be performed more efficiently. Another advantage is a significant reduction in the tools is required i.e. one tool can be used to clinch studs, nuts, standoffs, etc. Yet another advantage is that the manufacturing costs of the novel multi-tool are minimal due to simplicity in design.

A feature of the present invention is a savings to its users by allowing for single handling of parts with several styles of fasteners. For example, all #8 studs, nuts, and standoffs, etc. can be installed with one handling. The prior art designs required re-tooling each time the fastener type and size changed. Another feature is the novel tool design could be incorporated into the autofeed tooling currently being used in order to enhance manufacturing capabilities and produce cost savings. Still yet another feature is that parts of the novel tool may be interchangeable to further increase the combinations of multiple fasteners that can be installed with one basic tool.

BRIEF DESCRIPTION OF THE DRAWINGS

FIG. 1 is an enlarged cross-sectional view of the first embodiment of the novel apparatus, punch, and sheet of material.

FIG. 2 is the illustration of FIG. 1 along with a fastener positioned on the novel apparatus and sheet of material in place before compression.

FIG. 3 is an enlarged cross-sectional view from FIG. 2 of the punch lowered into the compressed position.

FIG. 4 is the illustration of FIG. 3 depicting the novel apparatus and punch.

FIG. 5 is an enlarged cross-sectional view of the second embodiment of the novel apparatus, punch, and sheet of material.

FIG. 6 is the illustration of FIG. 5 along with a fastner positioned on the novel apparatus and sheet of material in place before compression.

FIG. 7 is an enlarged cross-sectional view from FIG. 6 of the punch lowered into the compressed position.

FIG. 8 is the illustration of FIG. 7 depicting the novel apparatus and punch.

FIG. 9 is an enlarged cross-sectional view of the third embodiment of the novel apparatus, punch, and sheet of material.

FIG. 10 is the illustration of FIG. 9 along with a fastner positioned on the novel apparatus and sheet of material in place before compression.

FIG. 11 is an enlarged cross-sectional view from FIG. 10 of the punch lowered into the compressed position.

FIG. 12 is the illustration of FIG. 11 depicting the novel apparatus and punch.

FIG. 13 is an enlarged cross-sectional view of the fourth embodiment of the novel apparatus, punch, and sheet of material.

FIG. 14 is the illustration of FIG. 13 along with a fastner positioned on the novel apparatus and sheet of material in place before compression.

FIG. 15 is an enlarged cross-sectional view from FIG. 14 of the punch lowered onto the novel apparatus and fastener of FIG. 13 in the compressed position.

FIG. 16 is the illustration of FIG. 15 depicting the novel apparatus and punch.

DETAILED DESCRIPTION OF THE PREFERRED EMBODIMENTS

Referring now to FIG. 1, the first embodiment of the novel apparatus 2 will now be described. The apparatus 2 includes a cylindrical member 4 that has a first outer cylindrical surface 6 that extends to the radial shoulder 8 that in turn extends to the second outer cylindrical surface 10. On a first end 14 of the cylindrical member 4 is the first inner bore 16 that terminates at the end 18.

A sleeve 26 is slidably disposed about the cylindrical member 4. The sleeve member 26 has a first radial end 28 that extends to the inner annular surface 29 that in turn extends to the second radial end 30, with second radial end 30 extending to the outer cylindrical cover 32. The first radial end 28 may be referred to as a depressed shoulder 28 and the second radial end 30 may be referred to as a raised shoulder 30. The outer cover surface 32 terminates at the end 34 which extends radially inward to the first inner bore 36. The first inner bore 36 stretches to the shoulder 38 which in turn extends to the second inner bore 40. As depicted, the end 14 is proximate (i.e. even with) the depressed shoulder 28 with the spring biasing the sleeve 26.

A spring chamber 41 is formed via the sleeve cover 32 and the outer cylindrical surface 6 of the cylindrical member 4. Within the spring chamber 41 will be the biasing means 42 for biasing the sleeve upward. As shown in FIG. 1, the first radial end 28 is level with the first end 14 when the biasing means 42 is extended. In FIG. 1 the biasing means 42 is a compression type of spring. The sleeve 26 may be biased downward relative to the first end 14 by a force acting against the first radial end 28 and/or second radial end 30. The apparatus 2 can be mounted in the press by conventional means, which is readily understood by those of ordinary skill in the art. Thus, the second end 20 and groove 12 is mounted to the anvil of the press.

Referring now to FIG. 2, an illustration of the apparatus of FIG. 1 along with a fastener 44, sheet of material 46 and punch 48 will now be described. In the most preferred embodiment, the sheet of material 46 is a sheet of metal. It should be noted that like numbers appearing in the various figures refer to like components. The fastener 44 is commercially available from Penn Engineering & Manufacturing Corporation under the name Self Clinching Fastener. Throughout this application, self clenching fasteners refer to fasteners, studs, standoffs, etc. The fastener 44 shown in FIG. 2 includes a generally cylindrical member having an outer cylindrical surface 50 that extends to a first radial shoulder 52, with the shoulder 52 terminating at the outer cylindrical surface 54 that in turn concludes at the first end 56. The fastener 44 also contains the second end 58, with the second end 58 abutting the end 14 of the cylindrical member 4 and the end 28 of the sleeve 26.

FIG. 2 is a view of the apparatus 2 before the fastener 44 gets pressed into the material of the sheet of metal 46. As depicted, the outer diameter surface 50 cooperates with and is seated within the radial end 28 of the sleeve 26. Also note that the end 58 abutting ends 28 and 14. FIG. 3 is a sequential drawing depicting the punch 48 having been lowered. The end 60 will contact the surface 62 of the sheet 46 which in turn will cause the sheet 46 to be lowered onto the fastener 44. The outer cylindrical surface 54 will be forced into opening 64 which in turn lowers the surface 66 of the sheet of metal 46 onto the radial shoulder 52 thereby pressing the fastener 44 into the material of the sheet 46 as is understood by those of ordinary skill in the art. FIG. 4 depicts the entire apparatus 2, sheet of metal 46 and punch 48.

With reference to FIG. 5, a cross-sectional view of the second embodiment will now be described. The second embodiment contains a urethane band 68 that is disposed within the spring chamber 41. As noted earlier, like numbers appearing in the various figures refer to like components. FIG. 6 depicts the fastener 44 that is seated on the top end of sleeve 26 as well as the end 14. Also illustrated in FIG. 6 is the punch 48 and sheet of metal 46 with opening 64. The FIG. 7 depicts the sequence wherein the punch 48 has been lowered. With this second embodiment, the lowering of the punch 48 will cause the sheet of metal 46 to come into contact with the fastener 44, and in particular, the opening 64. The fastener end 58 shoulders up against the end 14 of cylindrical member 4. In this manner, the fastener 44 is pressed into the material of the metal sheet 46, as is understood by those of ordinary skill in the art. FIG. 8 is a complete view of the lowered punch 48. Note that the spring means 68 remained in the extended state during the fastening.

In FIG. 9, an enlarged cross-sectional view of the third embodiment of the novel apparatus 2 is shown. Referring now to FIG. 10, the object to be pressed into the sheet of metal 46, which in this case may be either a standoff or stud type of object, is shown. Both these objects are commercially available from Penn Engineering & Manufacturing Corporation under the names Self Clinching Standoff and Self Clinching Stud. As shown in FIG. 10, the standoff 74 is inserted into the opening 64. As noted earlier, like numbers refer to like components in the various drawings.

The standoff 74 is a generally a cylindrical member having an outer cylindrical surface 76 that extends to an upper radial shoulder 78. and wherein the upper radial shoulder 78 rest within and is supported by the opening 64 as shown in FIG. 9. The upper radial shoulder 78 extends to the inner bore 80 and concludes at the end 82. As shown in FIG. 9, the biasing means 42 biases the sleeve 26 upward so that end 14 of cylindrical member 4 is flush with end 28 of the sleeve 26. A compression spring 42 is depicted in FIG. 9

With reference again to FIG. 10, a complete view of the punch 48, sheet of metal 46, standoff 74, and apparatus 2 is shown. In operation, the punch 48 will be lowered so that the sheet of metal 46 and standoff 74 are lowered to the position depicted in FIG. 1 1. Continued downward movement of the punch 48 will press the standoff 74 into the material of the metal sheet 46. Due to the novel design herein described, the outer cylindrical surface 76 will be concentrically placed into the inner bore 16 of the cylindrical member 4. The metal sheet 46 will act against the end 30 of the sleeve 26. The spring 42 will compress, as shown in FIG. 11. The metal sheet 46 and punch 48 will continue to lower until the metal sheet 46 contacts the end 14 of the cylindrical member 4, at this point, the standoff 74 (or stud) will be pressed into the material. FIG. 12 represents an entire view of the punch 48, standoff 74, metal sheet 46, and apparatus 2.

After the standoff 74 has been pressed the punch 48 is lifted and the installation of that particular standoff 74 is complete. The operator may prepare for installation of another standoff, stud, fastener, nut, etc. without the necessity of retooling the anvil with a new tool. In other words, the apparatus 2 may be used with the installation of another standoff, stud, fastener, nut, etc. The prior art devices would have, by necessity, required another tool. Thus, the operator saves the time of re-tooling when shifting the installation of a standoff to a fastener.

Referring now to FIG. 13, an enlarged cross-sectional view of the fourth embodiment of the novel apparatus 2 will now be described FIG. 13 also depicts the object to be pressed into the sheet of metal 46, which in this case may be either a standoff or stud type of object. As pointed out earlier in the specification, both objects are commercially available from Penn Engineering & Manufacturing Corporation under the names Self Clinching Standoff and Self Clinching Stud. As shown in FIG. 13, the standoff 74 is inserted into the opening 64. As noted earlier, like numbers refer to like components in the various drawings.

The standoff 74 is a generally cylindrical member having an outer cylindrical surface 76 that extends to an upper radial shoulder 78, and wherein the upper radial shoulder rest within the opening 64 as shown in FIG. 13. The upper radial shoulder 78 extends to the inner bore 80 and to concludes at the end 82. As shown in FIG. 13, the biasing means 42 biases the sleeve 26 upward so that end 14 of cylindrical member 4 is flush with end 28 of the sleeve 26. A compression spring 42 is depicted in FIG. 13.

With reference to FIG. 14, a complete view of the punch 48, sheet of metal 46, standoff 74, and apparatus 2 is shown.

In operation, the punch 48 will be lowered so that the sheet of metal 46 and standoff 74 are lowered to the position depicted in FIG. 14. Continued downward movement of the punch 48 will press the standoff 74 into the material of the metal sheet 46. Due to the novel design herein described, the outer cylindrical surface 76 will be concentrically placed into the inner bore 16 of the cylindrical member 4. The metal sheet 46 will act against the end 30 of the sleeve 26. The spring 42 will compress, as shown in FIG. 15. The metal sheet 46 and punch 48 will continue to lower until the metal sheet 46 contacts the end 14 of the cylindrical member 4; at this point, the standoff 74 (or stud) will be pressed into the material. FIG. 16 represents an entire view of the punch 48, standoff 74, metal sheet 46, and apparatus 2.

After the standoff 74 has been pressed, the punch 48 is lifted and the installation of that particular standoff 74 is complete. The operator may prepare for installation of another standoff stud, fastener, nut, etc. without the necessity of retooling the anvil with a new tool. In other words, the apparatus 2 may be used with installation of another standoff, stud, fastener, nut, etc. The prior art devices would have, by necessity, required another tool. Thus, the operator saves the time of re-tooling when shifting the installation of a standoff to a fastener.

While preferred embodiments of the present invention have been described, it is to be understood that the embodiments described are illustrative only and that the scope of the invention is to be defined solely by the appended claims when accorded a fully range of equivalence, many variations and modifications naturally occurring to those skilled in the art from a perusal thereof.

I claim:

1. An apparatus for inserting a self clenching fastener into a sheet of material, the apparatus comprising:
   a cylindrical member having a bore, said cylindrical member having a radial shoulder thereon;
   a sleeve disposed about said cylindrical member, said sleeve having a first end and a second end, and wherein said first end has a raised shoulder and a depressed shoulder;
   a spring member disposed about said cylindrical member and engaged with said radial shoulder, said spring member biasing said sleeve in a first direction.

2. The apparatus of claim 1 wherein said spring member is a urethane band placed about said cylindrical member.

3. The apparatus of claim 2 wherein said cylindrical member has a first end and a second end, and wherein said spring member biases said depressed shoulder of said sleeve proximate with said first end of said cylindrical member.

4. The apparatus of claim 3 wherein said cylindrical member has an outer diameter and wherein said sleeve includes an inner diameter greater than said outer diameter of said cylindrical member.

5. The apparatus of claim 1 wherein said spring member is a compression spring placed about said cylindrical member.

6. The apparatus of claim 5 wherein said cylindrical member has a first end and a second end, and wherein said spring member biases said depressed shoulder of said sleeve proximate with said first end of said cylindrical member.

7. The apparatus of claim 6 wherein a cover portion of said sleeve surrounds said compression spring.

8. A device for inserting a self clenching fastener into a sheet of material with a press machine, the press machine including a ram and an anvil, and wherein said ram is movable from a first position to a second position and said anvil is stationary, the device comprising:

a cylindrical member having a first end and a second end, and wherein said first end contains a bore and said second end is mounted to the anvil, and wherein said first end has formed thereon a radial shoulder;

a sleeve disposed about said cylindrical member, said sleeve having a raised shoulder and a depressed shoulder;

means, engaged with said radial shoulder, for biasing said sleeve in a first direction.

9. The device of claim 8 wherein said raised shoulder of said sleeve is biased by said biasing means at a height above said first end of said cylindrical member.

10. The device of claim 9 wherein said biasing means is a urethane band placed about said cylindrical member.

11. The device of claim 10 wherein said urethane band abuts said radial shoulder.

12. The device of claim 11 wherein said cylindrical member has an outer diameter and wherein said sleeve includes an inner diameter as least as large as said cylindrical member's outer diameter.

13. The device of claim 9 wherein said biasing means is a compression spring placed about said cylidrical member.

14. The device of claim 13 wherein said compression spring abuts said radial shoulder.

15. The device of claim 14 wherein a cover portion of said sleeve surrounds said compression spring.

16. A method for inserting a self clinching fastener having a head portion and a shaft portion into a sheet of material with a press, the press including an anvil and a movable punch, with the anvil having an apparatus mounted thereon, the apparatus comprising a cylindrical member having a first end and a second end, said first end including an inner bore and a radial shoulder and said second end being mounted to the anvil, a sleeve disposed about said cylindrical member, said sleeve having a raised shoulder and a depressed shoulder, and a spring member disposed about said cylindrical member and engaged with said radial shoulder to bias said sleeve in a first direction, said method comprising:

positioning the sheet of material between the punch and the apparatus, said sheet of material including a hole therein adapted to receive the shaft portion of the fastener therethrough;

placing the self-clinching fastener through the hole in the sheet with the head portion of the fastener being located adjacent the punch and with the shaft portion of the fastener being located adjacent the apparatus;

lowering the punch toward the apparatus;

contacting the head portion of the fastener with said punch;

moving said punch toward said apparatus such that the shaft portion of said fastener extends into said inner bore of said cylindrical member and said sheet of material contacts said raised shoulder of said sleeve;

continuing movement of said punch toward said apparatus to force the sleeve downward against the bias of the spring member until said sheet of material abuts with said first end of said cylindrical member; and pressing the self clinching fastener into the sheet of material with said punch.

17. The method of claim 16 wherein said spring member is a urethane band disposed about said cylindrical member, and said urethane band is compressed when said sleeve is forced downward by said punch.

18. The method of claim 16 wherein said spring member is a compression spring that includes a series of coils, and said series of coils are compressed when said sleeve is forced downward by said punch.

* * * * *